United States Patent
Nair

(10) Patent No.: US 9,449,058 B2
(45) Date of Patent: Sep. 20, 2016

(54) MULTIPLE ROW LATERAL TABLE VIEW WITH ROW SET SCROLL AND ROW HISTORY FLIP

(75) Inventor: Sanej Chandrasenan Nair, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 696 days.

(21) Appl. No.: 12/893,087

(22) Filed: Sep. 29, 2010

(65) Prior Publication Data

US 2012/0079415 A1    Mar. 29, 2012

(51) Int. Cl.
G06F 3/048  (2013.01)
G06F 17/30  (2006.01)
G06F 3/0484  (2013.01)
G06F 17/24  (2006.01)

(52) U.S. Cl.
CPC ..... *G06F 17/30554* (2013.01); *G06F 3/04842* (2013.01); *G06F 17/245* (2013.01)

(58) Field of Classification Search
CPC .............. G06F 17/245; G06F 17/246; G06F 3/04842; G06F 17/30554
USPC ........................................ 715/781, 764, 227
See application file for complete search history.

(56) References Cited

U.S. PATENT DOCUMENTS

| | | | |
|---|---|---|---|
| 5,317,306 A | 5/1994 | Abraham et al. | |
| 6,313,848 B1 | 11/2001 | Hoag | |
| 2004/0010751 A1 | 1/2004 | Merkel et al. | |
| 2004/0017475 A1* | 1/2004 | Akers et al. | 348/207.1 |
| 2005/0060647 A1* | 3/2005 | Doan et al. | 715/514 |
| 2006/0184889 A1* | 8/2006 | Molander | 715/764 |
| 2009/0089662 A1 | 4/2009 | Wulkan et al. | |

OTHER PUBLICATIONS

Jain, Neeraj, Displaying vertical rows in a DataGrid, http://www.codeproject.com/kb/database/Vertical_rows_in_datagrid.aspx, Sep. 21, 2003, 4 pages.
FileGuru.com, Excel Swap (Reverse) Rows & Columns Software 7.0, http://www.fileguru.com/Excel-Swap--Reverse--Columns-Software/download, Copyright 2000-2010, 4 pages.
Productivity Portfolio, How to Switch Excel Columns and Rows, http://www.timeatlas.com/5_minute_tips/general/how_to_switch_excel_columns_and_rows, Copyright 2000-2010.
Hughes, Mike, Designing Tables 101, http://www.uxmatters.com/mt/archives/2009/09/designing-tables-101.php, Sep. 21, 2009, 9 pages.

(Continued)

*Primary Examiner* — Ajay Bhatia
*Assistant Examiner* — Phuong Nguyen
(74) *Attorney, Agent, or Firm* — Kilpatrick Townsend & Stockton LLP

(57) ABSTRACT

Embodiments of the invention provide systems and methods for presenting instances of selected records in a vertical, side-by-side arrangement. According to one embodiment, presenting a view of data from a table of a database can comprise presenting a first tabular view of the data. In this first tabular view, each of a plurality of records of the table can be presented as a row of the tabular view and each field of each record can be presented as a column. Additionally, each column can include a heading associated with and identifying the fields of the records. A selection of two or more records of the plurality of records can be received and a second tabular view of the data of the selected records can be generated. The headings and rows from the first tabular view can comprise columns of the second tabular view.

5 Claims, 5 Drawing Sheets

(56) References Cited

OTHER PUBLICATIONS

SAP Community Network Forums, Table in vertical direction?, http://forums.sdn.sap.com.thread.jspa?messageID=8496797&tstart=0, downloaded Dec. 10, 2010, 4 pages.

Kim, Loel et al, "Presenting Information On the Small-Screen Interface: Effects of Table Formatting", IEEE Transactions on Professional Communication, vol. 46, No. 2, Jun. 2003, 11 pages.

Finnigan, Pete, Introduction to Simple Oracle Auditing, http://www.securityfocus.com/infocus/1689, Apr. 28, 2003, 4 pages.

Microsoft Corporation, Row level auditing/tracking of changes to the data, http://social.msdn.microsoft.com/Forums/en-US/transactsql/thread/19eb18bc-efac-4584-bb37-c0fc9d42f0af, 2010, 2 pages.

\* cited by examiner

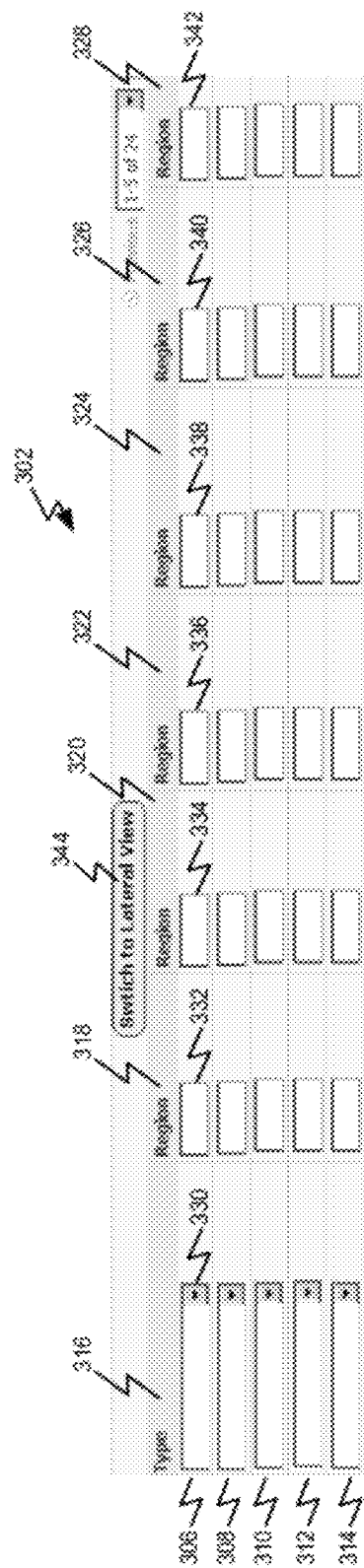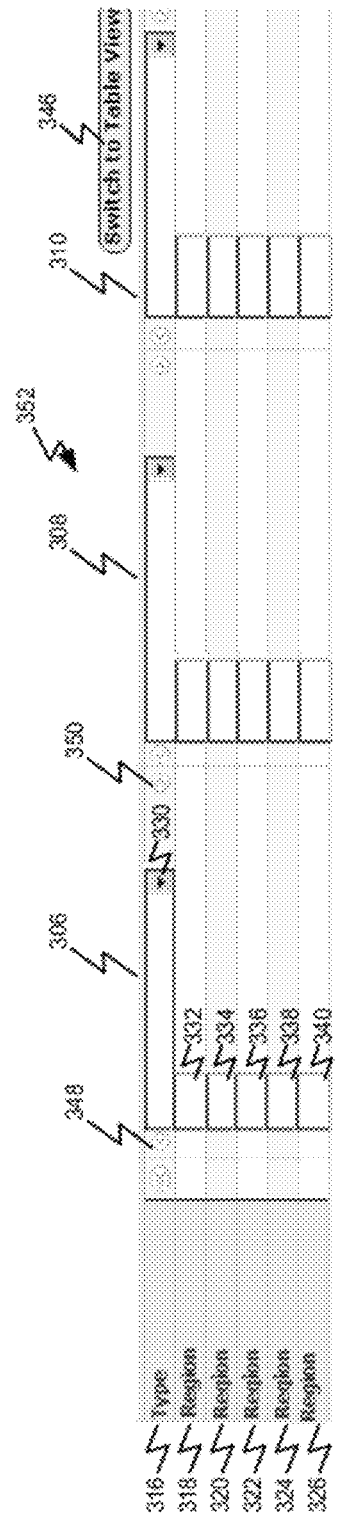
FIG. 3A
FIG. 3B

MULTIPLE ROW LATERAL TABLE VIEW WITH ROW SET SCROLL AND ROW HISTORY FLIP

BACKGROUND OF THE INVENTION

Embodiments of the present invention relate generally to methods and systems for presenting data from a set of records and more particularly to presenting instances of selected records in a vertical, side-by-side arrangement in which individual instances of each of the records can be selected and viewed.

Data from records of a database table can be presented, e.g., displayed, to a user in a manner that represents the logical arrangement of the data. More specifically, the traditional table view has every record of the database table listed in rows, one above the other. However, scrolling horizontally on a long table, i.e., one with many fields, has always been an issue with end users. While a form-type page relieves this problem a little, this type of view looses the ability to compare rows side-by-side. Further, if the database maintains viewable versions of previous values or instances for the records, the preserved historical information complicates the whole view and cannot be presented in an easily viewed format. Hence, there is a need for improved methods and systems for presenting data from a set of records.

BRIEF SUMMARY OF THE INVENTION

Embodiments of the invention provide systems and methods for presenting instances of selected records in a vertical, side-by-side arrangement in which individual instances of each of the records can be selected and viewed. According to one embodiment, a method for presenting a view of data from a table of a database can comprise presenting a first tabular view of the data. In this first tabular view, each of a plurality of records of the table can be presented as a row of the tabular view and each field of each record can be presented as a column. Additionally, each column can include a heading associated with and identifying the fields of the records. A selection of two or more records of the plurality of records can be received and a second tabular view of the data of the selected records can be generated. The headings and rows from the first tabular view can comprise columns of the second tabular view. For example, generating the second tabular view can comprise generating a first column of the second tabular view comprising the headings from the first tabular view and generating a set of columns corresponding to the first column and including the fields of the selected records. The second tabular view can then be presented.

Each record of the table can comprise a plurality of instances. For example, the plurality of instances for each record can comprise a series such as a historical set of data for the record. A selection of one of the records of the second tabular view can be received. A selection of one of the instances of the selected record of the second tabular view can also be received. The column of the second tabular view representing the selected record can be updated with the data of the selected instance. The presented second tabular view can then be with the updated column representing the selected record.

According to another embodiment, a system can comprise a processor and a memory communicatively coupled with and readable by the processor. The memory can have stored therein a sequence of instructions which, when executed by the processor, cause the processor to present a view of data from a table of a database by presenting a first tabular view of the data. In this first tabular view, each of a plurality of records of the table can be presented as a row of the tabular view and each field of each record can be presented as a column. Additionally, each column can include a heading associated with and identifying the fields of the records. A selection of two or more records of the plurality of records can be received and a second tabular view of the data of the selected records can be generated. The headings and rows from the first tabular view can comprise columns of the second tabular view. For example, generating the second tabular view can comprise generating a first column of the second tabular view comprising the headings from the first tabular view and generating a set of columns corresponding to the first column and including the fields of the selected records. The second tabular view can then be presented.

Each record of the table can comprise a plurality of instances. For example, the plurality of instances for each record can comprise a series such as a historical set of data for the record. A selection of one of the records of the second tabular view can be received. A selection of one of the instances of the selected record of the second tabular view can also be received. The column of the second tabular view representing the selected record can be updated with the data of the selected instance. The presented second tabular view can then be with the updated column representing the selected record.

According to yet another embodiment, a machine-readable memory can have stored thereon a sequence of instructions which, when executed by a processor, cause the processor to present a view of data from a table of a database by presenting a first tabular view of the data. In this first tabular view, each of a plurality of records of the table can be presented as a row of the tabular view and each field of each record can be presented as a column. Additionally, each column can include a heading associated with and identifying the fields of the records. A selection of two or more records of the plurality of records can be received and a second tabular view of the data of the selected records can be generated. The headings and rows from the first tabular view can comprise columns of the second tabular view. For example, generating the second tabular view can comprise generating a first column of the second tabular view comprising the headings from the first tabular view and generating a set of columns corresponding to the first column and including the fields of the selected records. The second tabular view can then be presented.

Each record of the table can comprise a plurality of instances. For example, the plurality of instances for each record can comprise a series such as a historical set of data for the record. A selection of one of the records of the second tabular view can be received. A selection of one of the instances of the selected record of the second tabular view can also be received. The column of the second tabular view representing the selected record can be updated with the data of the selected instance. The presented second tabular view can then be with the updated column representing the selected record.

BRIEF DESCRIPTION OF THE DRAWINGS

FIGS. 3A and 3B represent exemplary user interfaces for presenting instances of selected records in a vertical, side-by-side arrangement in which individual instances of each of the records can be selected and viewed according to one embodiment of the present invention.

DETAILED DESCRIPTION OF THE INVENTION

Figure 1:
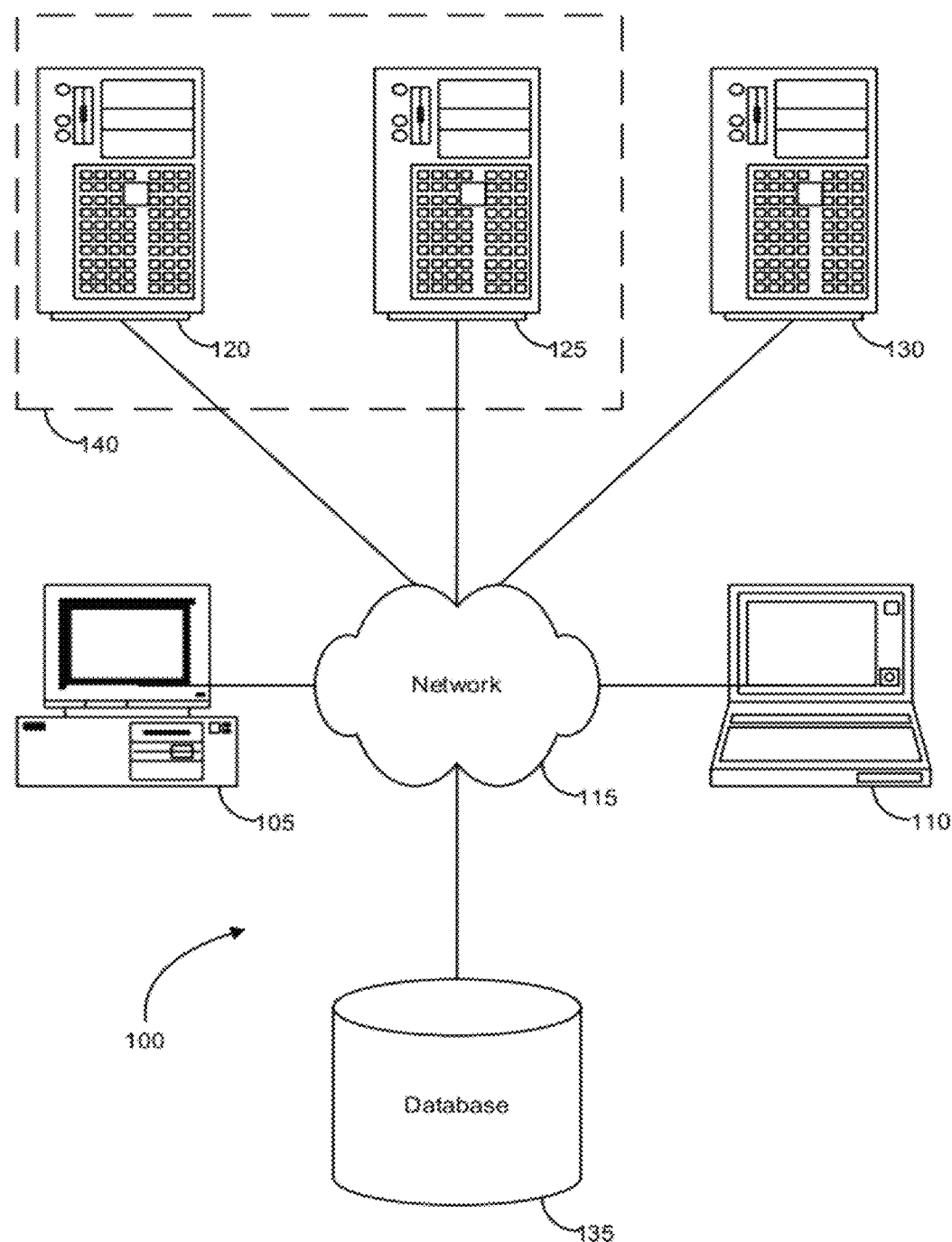
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for presenting data from a set of records of a database. More specifically, embodiments of the present invention provide for presenting instances of selected records in a vertical, side-by-side arrangement in which individual instances of each of the records can be selected and viewed. This changes the traditional view of database records to a column or vertical orientation so that rows can be viewed vertically rather than horizontally including headings/labels for columns. This allows side-by-side viewing and possibly updating of multiple rows vertically, with the ability to traverse to next/previous set of rows. Embodiments of the present invention also provide easy access to views to instances such as historical/date effective changes of any given record. Examples of data that may be presented and manipulated in this way include but are not limited to personnel or Human Resources (HR) records, financial records, readings from instrumentation, test results for medical tests, etc.

Stated another way, presenting a view of data from a table of a database can comprise presenting a first tabular view of the data. In this first tabular view, each of a plurality of records of the table can be presented as a row of the tabular view and each field of each record can be presented as a column. Additionally, each column can include a heading associated with and identifying the fields of the records. A selection of two or more records of the plurality of records can be received and a second tabular view of the data of the selected records can be generated. The headings and rows from the first tabular view can comprise columns of the second tabular view. For example, generating the second tabular view can comprise generating a first column of the second tabular view comprising the headings from the first tabular view and generating a set of columns corresponding to the first column and including the fields of the selected records. The second tabular view can then be presented.

Each record of the table can comprise a plurality of instances. For example, the plurality of instances for each record comprises a series such as a historical set of data for the record. A selection of one of the records of the second tabular view can be received. A selection of one of the instances of the selected record of the second tabular view can also be received. The column of the second tabular view representing the selected record can be updated with the data of the selected instance. The presented second tabular view can then be with the updated column representing the selected record. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
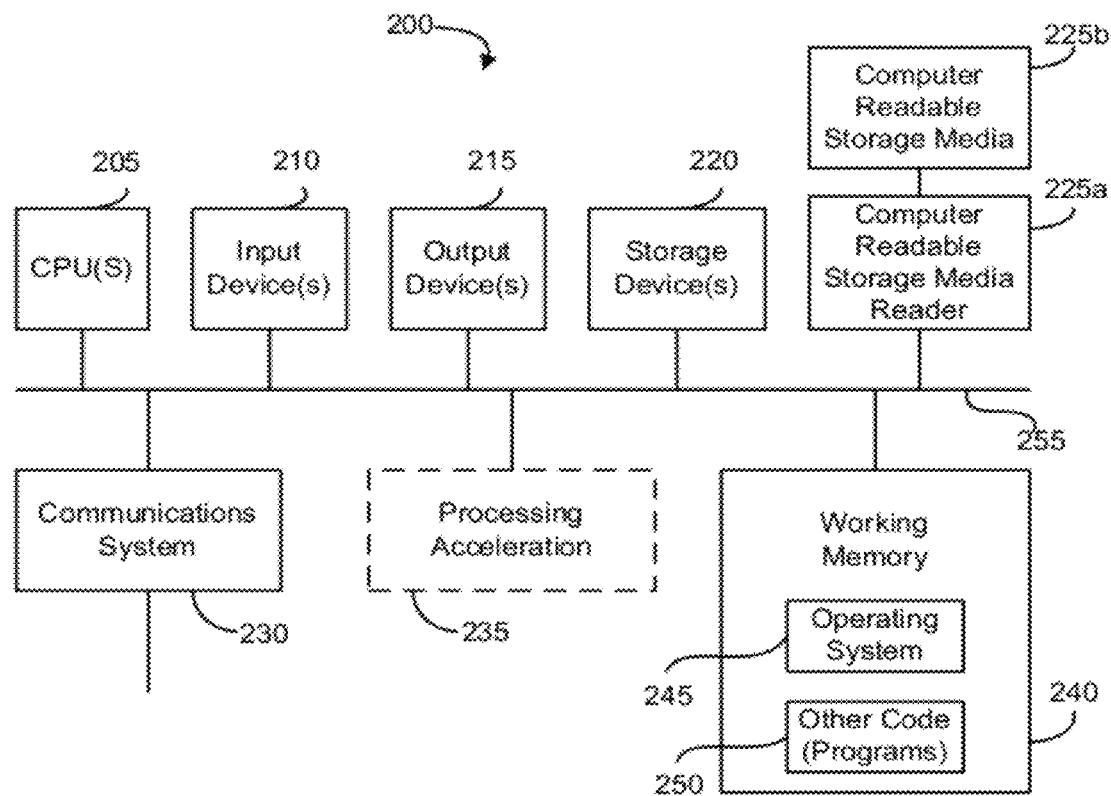
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

FIGS. 3A and 3B represent exemplary user interfaces for presenting instances of selected records in a vertical, side-by-side arrangement in which individual instances of each of the records can be selected and viewed according to one embodiment of the present invention. As illustrated in FIG. 3A, data from records of a database table such as query results can be presented, e.g., displayed in a graphical user interface as illustrated here or in another graphical, textual, or other format, to a user in a first tabular view 302 in which every record of the database table is listed horizontally in rows, one above the other. In this first tabular view 302, each of a plurality of records 306-314 of the table can be presented as a row of the tabular view 302 and each field of each record, for example fields 330-342 of the first record 306, can be presented as a column. Additionally, each column can include a heading 316-328 associated with and identifying the fields 306-314 of the records.

As noted above, embodiments of the invention provide for presenting instances of selected records in a vertical, side-by-side arrangement in which individual instances of each of the records can be selected and viewed. This changes the view of database records from the horizontal presentation illustrated by the first tabular view 302 in FIG. 3A to a column or vertical orientation as illustrated by a second tabular view 352 represented by FIG. 3B so that rows can be viewed vertically rather than horizontally including headings/labels for columns. This allows side-by-side viewing and possibly updating of multiple rows vertically, with the ability to traverse to next/previous set of rows.

For example, all of the presented records 306-314 or some set of the records less than all, e.g., records 306, 308, and 310, can be presented in the second tabular view 352. That is, in some cases, all of the presented records 306-314 of the first tabular view 302 may be selected automatically, by default, based on some user indication, or by some other criteria. In other cases, less than all of the records 306-314 may be selected by a user manipulating the graphical user interface, for example by clicking or dragging a cursor over certain desired records, based on the results of a query or sub-query to identify records containing certain desired fields, based on configuration information of other pre-defined number of records, e.g., the top three or bottom four etc. records presented, or by any other set of criteria.

Regardless of exactly how some or all of the records are selected, a selection of two or more records, e.g., 306, 308, and 310, of the plurality of records 306-314 can be received and a second tabular view 352 of the data of the selected records 306, 308, and 310 can be generated, for example in response to a user clicking, selecting, or otherwise manipulating an element of the interface such as the "Switch" button 344 illustrated in FIG. 3A. As noted above, the headings 316-328 and rows from the first tabular view 302 can comprise columns of the second tabular view 352. So for example, generating the second tabular view 352 can comprise generating a first column of the second tabular view comprising the headings 316-326 from the first tabular view and generating a set of columns corresponding to the first column and including the fields of the selected records 306, 308, and 310. The second tabular view 352 can then be presented e.g., displayed in a graphical user interface as illustrated here or in another graphical, textual, or other format, to a user.

As noted above, embodiments of the present invention also provide easy access to views to instances such as historical/date effective changes of any given/selected record from within this second tabular view 352. Examples of data that may be presented and manipulated in this way include but are not limited to personnel or Human Resources (HR) records, financial records, readings from instrumentation, test results for medical tests, etc. Each record of tables containing such information can comprise a plurality of instances. For example, the plurality of instances for each record comprises a series such as a historical set of data for the record.

Therefore, a selection of one of the records of the second tabular view 352 can be received. Additionally or alternatively, a selection of one of the instances of the selected record of the second tabular view 352 can be received. For example, a user may select a record, e.g., 306, by clicking, hovering, or otherwise manipulating a cursor over the particular column. As illustrated here, a record, e.g., 306, and a particular instance of that record can be selected by the user clicking or otherwise manipulating one or more elements of the interface presenting the second tabular view such a buttons 348 and 350 for scrolling or otherwise navigating through, e.g., forward button 350 and backwards button 348, the instances based on a time order or other order. Regardless of the exact manner in which the records 306 and instance is selected, the column of the second tabular view 352 representing the selected record 306 can be updated with the data of the selected instance, i.e., fields 332-340 can be updated with the data for the selected instance. The presented second tabular view 352 can then be re-displayed with the updated column representing the selected record 306.

In some cases, the user may be able to switch back from the second tabular view 352 to the first tabular view. For example, such a change in the view can be performed in response to a user clicking, selecting, or otherwise manipulating an element of the interface such as the "Switch" button 346 illustrated in FIG. 3B. Such a switch back to the first tabular view 302 may be made before, after, or regardless of any selections of particular instances and/or changes made to the data thereof as presented in the second tabular view. That is, changes and/or selections made in the second tabular view 352 can be but need not be reflected in the first tabular view 302 upon switching back.

Thus, embodiments of the present invention allow a user viewing a large number of records, that may in turn each include a large number of fields, to easily rearrange and navigate the view of the records in a side-by-side comparison including any number of instances for the selected records. So for example, a user viewing payroll or human resources records in the first tabular view 302 can select a few of the records, e.g., 306, 308, and 310, that may be of interest and have them presented in the second tabular view 352 through which not only are the records presented in a vertical, side-by-side, i.e., column, arrangement, but through which the user can also scroll the instances thereof. So, such as in the example of payroll records, the user can, while viewing the side-by-side comparison of the second tabular view 352, e.g., presenting payroll records for selected employees, scroll through or otherwise select historical records, e.g., prior years' rates/salaries, for one or each of the employees. As noted above, other types of records and/or data and instances thereof are contemplated and considered to be equally useful with embodiments of the present invention.

Figure 4:
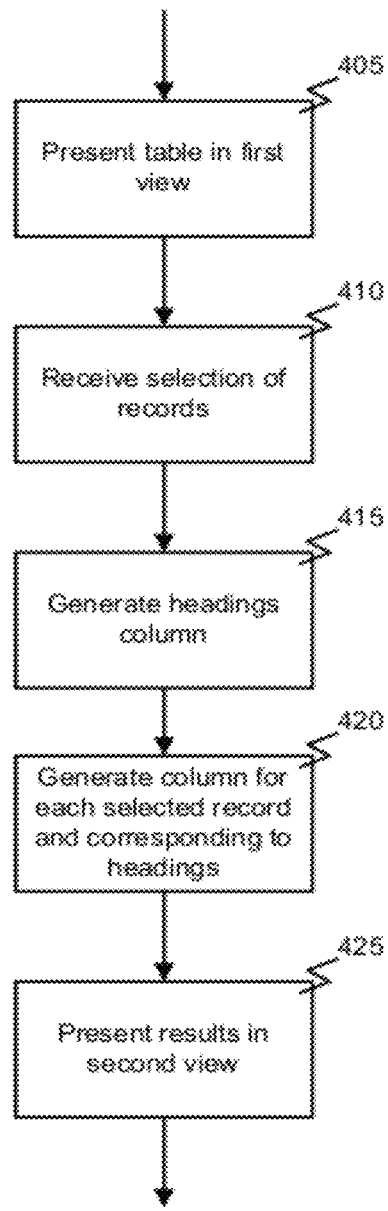
FIG. 4 is a flowchart illustrating a process for changing a table view to a vertical, side-by-side arrangement according to one embodiment of the present invention.

FIG. 4 is a flowchart illustrating a process for changing a table view to a vertical, side-by-side arrangement according to one embodiment of the present invention. In this example, processing begins with presenting 405 a first tabular view of the data, for example, such as illustrated in and described above with reference to FIG. 3A. In this first tabular view, as noted above, each of a plurality of records of the table can be presented as a row of the tabular view and each field of each record can be presented as a column. Additionally, each column can include a heading associated with and identifying the fields of the records. A selection of two or more records of the plurality of records can be received 410. Receiving 410 a selection of records can comprise receiving a user selection, e.g., by the user manipulating a user interface to "click" or otherwise indicate records, by receiving results of a query, or by other user, programmatic, or other indications.

A second tabular view of the data of the selected records can be generated. The headings and rows from the first tabular view can comprise columns of the second tabular view. For example, generating the second tabular view can comprise generating 415 a first column of the second tabular view comprising the headings from the first tabular view and generating 420 a set of columns corresponding to the first column and including the fields of the selected records. The second tabular view, for example, such as illustrated in and described above with reference to FIG. 3B, can then be presented 425, e.g., displayed in a graphical or textual user interface, printed, etc.

Figure 5:
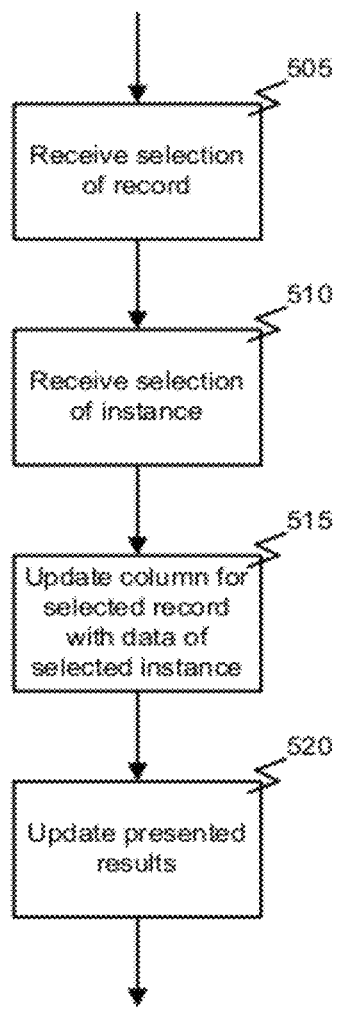
FIG. 5 is a flowchart illustrating a process for presenting multiple instances of each of the selected records within a vertical, side-by-side arrangement according to one embodiment of the present invention.

FIG. 5 is a flowchart illustrating a process for presenting multiple instances of each of the selected records within a vertical, side-by-side arrangement according to one embodiment of the present invention. As noted above, each record of the table can comprise a plurality of instances. For example, the plurality of instances for each record comprises a series such as a historical set of data for the record. A selection of one of the records of the second tabular view can be received 505. Receiving 505 a selection of one of the records can comprise receiving a user selection, e.g., by the user manipulating a user interface to "click" or otherwise indicate records, by receiving results of a query, or by other user, programmatic, or other indications. A selection of one of the instances of the selected record of the second tabular view can also be received 510. For example, receiving 510 selection of an instance of a record can comprise the user selecting or clicking a user interface element such as described above with reference to FIG. 3B. The column of the second tabular view representing the selected record can be updated 515 with the data of the selected instance. The presented second tabular view can then be with the updated 520 column representing the selected record.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for presenting a view of data from a table of a database, the method comprising:

presenting with a computer system a first tabular view of the data comprising headings and rows, wherein each record of a plurality of records of the table are presented as a row of the first tabular view, wherein each field of each record is presented as a column of the first tabular view, wherein each column includes a heading associated with and identifying the fields of the records, wherein each record of the table comprises a plurality of instances, wherein the plurality of instances for each record comprises a series of date effective changes for the record, wherein the series of date effective changes for the record comprises a historical set of previous data for the record, wherein the first tabular view includes only a first date-specific instance for each record of the plurality of instances, and wherein the first tabular view includes a graphical element indicating an alternate view of the data;

receiving at the computer system a selection of one or more records of the plurality of records;

receiving at the computer system a selection of the graphical element indicating the alternate view of the data;

generating with the computer system in response to the selection of the graphical element indicating the alternate view of the data a second tabular view of the data of the selected records, wherein the headings and the rows from the first tabular view comprise columns of the second tabular view, wherein the second tabular view includes at least a second date-specific instance for each selected record of the plurality of instances of the selected records, and wherein generating the second tabular view comprises:

generating a first column of the second tabular view comprising the headings from the first tabular view, and generating a set of columns corresponding to the first column and including the fields of the selected records;

presenting the second tabular view representing the selected records and the historical set of data for individual records of the selected records with one or more user-selectable options to navigate backwards and/or forwards between multiple historical views of the respective individual records of the selected records, wherein each historical view presents values of the fields corresponding to a specified date in a single view;

receiving at the computer system a subsequent selection of one instance of the plurality of instances that represents a prior time in the series of date effective changes corresponding to one of the selected records of the second tabular view; and updating with the computer system at least one column of the set of columns with a set of data corresponding to the subsequent selection.

2. The method of claim 1, further comprising updating with the computer system the presented second tabular view with the at least one column of the set of columns that was updated with the set of data corresponding to the subsequent selection.

3. A system comprising:
a processor; and
a memory communicatively coupled with and readable by the processor and having stored therein a sequence of instructions which, when executed by the processor, cause the processor to:
present a view of data from a table of a database by presenting a first tabular view of the data comprising headings and rows, wherein each record of a plurality of records of the table are presented as a row of the first tabular view, wherein each field of each record is presented as a column of the first tabular view, wherein each column includes a heading associated with and identifying the fields of the records, wherein each record of the table comprises a plurality of instances, wherein the plurality of instances for each record comprises a series of date effective changes for the record, wherein the series of date effective changes for the record comprises a historical set of previous data for the record, wherein the first tabular view includes only a first date-specific instance for each record of the plurality of instances, and wherein the first tabular view includes a graphical element indicating an alternate view of the data;
process a selection of one or more records of the plurality of records;
process a selection of the graphical element indicating the alternate view of the data;
generate in response to the selection of the graphical element indicating the alternate view of the data a second tabular view of the data of the selected records, wherein the headings and the rows from the first tabular view comprise columns of the second tabular view, wherein the second tabular view includes at least a second date-specific instance for each selected record of the plurality of instances of the selected records, and wherein generating the second tabular view comprises:
generating a first column of the second tabular view comprising the headings from the first tabular view, and
generating a set of columns corresponding to the first column and including the fields of the selected records;
cause presentation of the second tabular view representing the selected records and the historical set of data for individual records of the selected records with one or more user-selectable options to navigate backwards and/or forwards between multiple historical views of the respective individual records of the selected records, wherein each historical view presents values of the fields corresponding to a specified date in a single view;
receive a subsequent selection of one instance of the plurality of instances that represents a prior time in the series of date effective changes corresponding to one of the selected records of the second tabular view; and update at least one column of the set of columns with a set of data corresponding to the subsequent selection.

4. The system of claim 3, further comprising updating the presented second tabular view with the at least one column of the set of columns that was updated with the set of data corresponding to the subsequent selection.

5. A non-transitory, machine-readable medium having stored thereon a sequence of instructions which, when executed by a processor, cause the processor to present a view of data from a table of a database by:
presenting a first tabular view of the data comprising headings and rows, wherein each record of a plurality of records of the table are presented as a row of the first tabular view, wherein each field of each record is presented as a column of the first tabular view, wherein each column includes a heading associated with and identifying the fields of the records, wherein each record of the table comprises a plurality of instances, wherein the plurality of instances for each record comprises a series of date effective changes for the record, wherein the series of date effective changes for the record comprises a historical set of previous data for the record, wherein the first tabular view includes only a first date-specific instance for each record of the plurality of instance, and wherein the first tabular view includes a graphical element indicating an alternate view of the data;
receiving a selection of one or more records of the plurality of records;
receiving a selection of the graphical element indicating the alternate view of the data;
generating in response to the selection of the graphical element indicating the alternate view of the data a second tabular view of the data of the selected records, wherein the headings and the rows from the first tabular view comprise columns of the second tabular view, wherein the second tabular view includes at least a second date-specific instance for each selected record of the plurality of instances of the selected records, and wherein generating the second tabular view comprises:
generating a first column of the second tabular view comprising the headings from the first tabular view, and
generating a set of columns corresponding to the first column and including the fields of the selected records;
presenting the second tabular view representing the selected records and the historical set of data for individual records of the selected records with one or more user-selectable options to navigate backwards and/or forwards between multiple historical views of the respective individual records of the selected records, wherein each historical view presents values of the fields corresponding to a specified date in a single view;
receiving a subsequent selection of one instance of the plurality of instances that represents a prior time in the series of date effective changes corresponding to one of the selected records of the second tabular view; and
updating at least one column of the set of columns with a set of data corresponding to the subsequent selection.

* * * * *

UNITED STATES PATENT AND TRADEMARK OFFICE
CERTIFICATE OF CORRECTION

PATENT NO.         : 9,449,058 B2
APPLICATION NO.    : 12/893087
DATED              : September 20, 2016
INVENTOR(S)        : Nair It is certified that error appears in the above-identified patent and that said Letters Patent is hereby corrected as shown below:

On the Title Page

Column 2, under Other Publications, Line 5, delete "Reverse--Columns-" and insert
-- Reverse--Rows---Columns- --, therefor.

Column 2, under Other Publications, Line 9, delete "2000-2010." and insert -- 2010, 2 pages. --,
therefor.

On page 2, Column 1, under Other Publications, Line 2, delete "com.thread" and insert
-- com/thread --, therefor.

Signed and Sealed this
Sixth Day of June, 2017

Michelle K. Lee
*Director of the United States Patent and Trademark Office*